(12) United States Patent
Mowrey et al.

(10) Patent No.: US 9,788,041 B2
(45) Date of Patent: Oct. 10, 2017

(54) ENTERTAINMENT CONTENT RENDERING APPLICATION

(75) Inventors: David Mowrey, Atlanta, GA (US);
Laura Poffenberger, Atlanta, GA (US)

(73) Assignee: Yahoo Holdings, Inc., Sunnyvale, CA (US)

( * ) Notice: Subject to any disclaimer, the term of this patent is extended or adjusted under 35 U.S.C. 154(b) by 404 days.

(21) Appl. No.: 13/220,654

(22) Filed: Aug. 29, 2011

(65) Prior Publication Data
US 2012/0174158 A1    Jul. 5, 2012

Related U.S. Application Data

(63) Continuation-in-part of application No. 12/982,811, filed on Dec. 30, 2010.

(51) Int. Cl.
| | |
|---|---|
| *H04N 5/445* | (2011.01) |
| *H04N 21/41* | (2011.01) |
| *H04N 21/422* | (2011.01) |
| *H04N 21/658* | (2011.01) |
| *H04N 21/81* | (2011.01) |
| H04N 21/25 | (2011.01) |

(52) U.S. Cl.
CPC ... *H04N 21/4126* (2013.01); *H04N 21/42202* (2013.01); *H04N 21/6582* (2013.01); *H04N 21/8133* (2013.01); *H04N 21/251* (2013.01); *H04N 21/252* (2013.01); *H04N 21/4104* (2013.01)

(58) Field of Classification Search
CPC .............. H04N 21/251; H04N 21/252; H04N 21/6582; H04N 21/4104
USPC ........................ 725/40, 41, 43, 46, 133, 153
See application file for complete search history.

(56) References Cited

U.S. PATENT DOCUMENTS

| | | | | |
|---|---|---|---|---|
| 6,112,186 | A  * | 8/2000 | Bergh et al. | 705/7.32 |
| 6,263,505 | B1   | 7/2001 | Walker et al. | 725/110 |
| 7,966,395 | B1 * | 6/2011 | Pope et al. | 709/224 |
| 8,190,605 | B2 * | 5/2012 | Kuhlke | G06F 17/30241 |
| | | | | 707/732 |
| 8,312,487 | B1 * | 11/2012 | Walsh et al. | 725/46 |
| 8,554,784 | B2 * | 10/2013 | Nurminen | G06F 17/30206 |
| | | | | 707/708 |

(Continued)

*Primary Examiner* — Pankaj Kumar
*Assistant Examiner* — Sahar Baig
(74) *Attorney, Agent, or Firm* — Martine Penilla Group, LLP (57) ABSTRACT

Methods and system for generating companion content for rendering on a secondary device during presentation of content on a main device include detecting execution of a local application on the secondary device by a server application. The local application establishes a wireless connection through an application programming interface (API) with the secondary device and a device that interfaces with the main device and accesses metadata defining content being rendered on the main device. The local application transmits the metadata received from the device to the server application. Historical data is generated based on the metadata received from the secondary device. The metadata within the historical data is analyzed to identify surfing paths of one or more users over time. Companion content is generated based on the surfing paths of the one or more users and forwarded to the secondary device for rendering while the secondary device is connected to the device that interfaces with the main device.

9 Claims, 7 Drawing Sheets

(56) References Cited

U.S. PATENT DOCUMENTS

| | | | |
|---|---|---|---|
| 2004/0268413 A1 | 12/2004 | Reid et al. | 725/131 |
| 2006/0015902 A1* | 1/2006 | Matsuura et al. | 725/46 |
| 2007/0028266 A1* | 2/2007 | Trajkovic et al. | 725/46 |
| 2009/0131152 A1* | 5/2009 | Busse | G07F 17/32 463/23 |
| 2009/0133090 A1* | 5/2009 | Busse | H04N 7/163 725/132 |
| 2010/0251292 A1* | 9/2010 | Srinivasan et al. | 725/153 |
| 2015/0229691 A1* | 8/2015 | Liu | H04N 5/44543 709/219 |

* cited by examiner

ENTERTAINMENT CONTENT RENDERING APPLICATION

CLAIM OF PRIORITY

This application is a continuation-in-part of U.S. patent application Ser. No. 12/982,811, filed Dec. 30, 2010, and entitled "ENTERTAINMENT COMPANION CONTENT APPLICATION FOR INTERACTING WITH TELEVISION CONTENT," which is incorporated herein by reference in its entirety.

RELATED APPLICATION

This application is related to commonly owned U.S. patent application Ser. No. 13/075,149, filed Mar. 29, 2011, and entitled, "METHODS AND SYSTEMS FOR APPLICATION RENDERING AND MANAGEMENT ON INTERNET TELEVISION ENABLED DISPLAYS," U.S. application Ser. No. 12/894,569, filed on Sep. 30, 2010, entitled "System and Method for Controlling a Networked Display," and U.S. application Ser. No. 12/977,643, filed on Dec. 23, 2010, and entitled "Signal-Driven Interactive Television," each of which is herein incorporated by reference in its entirety.

BACKGROUND

Field of the Invention

The present invention relates to the field of entertainment, and more particularly, to automatically providing entertainment content related to television viewing with recommended and favorite shows.

Description of the Related Art

Watching a television is not what it used to be. The TV landscape has changed tremendously over generations. With more players providing content, more distributions channels offering content and more devices/ways for viewing content, it has become increasingly hard to keep track of what is being offered on what channels and at what times. The advance in technology has provided some relief on some fronts but has made it more complicated on other fronts. For instance, with the introduction of digital video recording options (DVR) and extended services, such as whole-house DVR, it is easier to record some of the shows in advance in some devices located in certain parts of the house and watch them later in other devices located in some other parts of the house. However, with the wide variety of shows and equally wide selection of channels, it is becoming increasingly hard to keep track of the shows, channels and times for viewing or recording. Further, with the ubiquitous nature of TV and with multiple TVs per house, TV viewing has become more individualistic adding to additional complication of keeping track of each individual's TV viewing preferences.

Conventional devices, such as remote controls, provide users the ability to pull up a program guide on a television screen, view the details and surf the guide to select various shows of interest. However, with the sheer number of channel offerings and quality of programs, users are faced with a daunting challenge of having to surf through hundreds of channels leading to user frustration and confusion. Further, when a user needs to preview additional offerings on the TV while watching a show on the TV screen, they have to recall the program guide on the TV screen to sort through the channel selections thereby interfering with their TV viewing.

It would be advantageous to provide a way for the users to manage the various shows of their likings in a simple and straight forward way without interfering with their television viewing while enriching the users TV viewing experience.

It is in this context that the embodiments of the invention arise.

SUMMARY

Embodiments of the present invention describe methods and systems that provide multimedia show content that is tailored to a particular user's preference. A user's preference of various multimedia shows is determined by identifying the surfing paths followed by the user on a multimedia viewing device, such as a television, over time. A local application executing on a secondary device communicates with a server application to provide metadata for the content viewed at the multimedia viewing device. The metadata captures data related to the user, such as demographics data, and data from user switch stream. The metadata received from the secondary device is used by the server application to generate historical data for the user. The historical data is analyzed at the server to identify the surfing paths of the user. The surfing paths define viewing metrics of the user over time by identifying the type of shows that the user has selected for viewing, point-to-point traversals wherein the point represents a particular channel/show selected for viewing, resident time at each traversal point and the time of day. Companion content is generated based on the analysis and forwarded to the secondary device for rendering while the secondary device is connected to the device that interfaces with the main device. The companion content rendered on the secondary device includes a tailored list of shows based on the user's traversals as disclosed in the metadata from the click stream collected over time. The user does not have to surf through the hundreds of channels to select shows of interest. The rendered list is interactive, enabling the user to select one or more multimedia show from the displayed list of content for viewing on the main device. Further, the list of content is rendered on the secondary device instead of on the main device, enabling the user to enjoy a selected program without compromising on the quality of TV viewing on the main device.

Conventional applications use the real-estate space on the main device to render a list of shows that is available to a user, for viewing. For instance, an application associated with a main device enables a control device, such as a remote control, to provide a listing of all the shows available for viewing in the form of a program guide. This program guide is rendered on the main device either alongside a show that the user is currently viewing or separately. Such rendering results in unnecessary consumption of the limited real-estate space on the main device causing hindrance to TV viewing and eventually compromising on the quality of TV viewing. Additionally, with the interactive television, the user is bombarded with promotional content, such as advertisement, based on the multimedia show that the user is watching. Such promotional content is also rendered on the main device alongside the multimedia show content further cluttering the real-estate space on the main device leading to additional hindrance during television viewing.

The embodiments of the invention, as briefly described above, address some of the problems faced by the users by using the real-estate space at the display devices of the main and the secondary devices in an optimally efficient manner. The user is able to navigate through the tailored list of content at the secondary device while continuing to watch and control his/her favorite shows on the main device unhindered. The content list at the secondary device is a focused and manageable list that is specific to the user based on the user's viewing preferences collected in switch stream over time. It should be appreciated that the present invention can be implemented in numerous ways, such as, methods, systems and an apparatus. Several inventive embodiments of the present invention are described below.

In one embodiment, a method for generating companion content for rendering on a secondary device during presentation of content on a main device is disclosed. The method includes detecting execution of a local application on the secondary device by a server application. The local application establishes a wireless connection through an application programming interface (API) between the secondary device and a device that interfaces with the main device. The API provides access to metadata regarding content being rendered on the main device and access to control selection of what is to be rendered on the main device. The local application interfaces with the server application over the internet. The server application communicates with the local application to receive at least a portion of the metadata from the secondary device. The portion of metadata includes the metadata received from the device that interfaces with the main device and metadata associated with the secondary device. The metadata associated with the secondary device includes data related to a particular user, such as user attributes in the form of demographic data, and metadata from the device that interfaces with the main device captures data related to user switch stream. The demographic data includes gender, geo location, age group, etc. Historical data is generated for the particular user using the metadata received from the secondary device. The historical data is analyzed to identify surfing paths of the particular user. Companion content is generated based on the user attributes and surfing paths of the particular user. The companion content is forwarded to the local application for rendering on the secondary device while the secondary device is connected to the device that interfaces with the main device.

In another embodiment, a method for generating companion content for rendering on a secondary device during presentation of content on a main device is disclosed. The method includes, for a plurality of users, detecting execution of a local application on the secondary device by a server application. The local application establishes a wireless connection between the secondary device and a device that interfaces with the main device through an application programming interface (API) so as to access the main device through the device. The API provides access to metadata regarding content being rendered on the main device and access to control selection of what is to be rendered on the main device. The local application is interfaced over the internet with the server application. The server application communicates with the local application over the internet to receive at least a portion of the metadata from the secondary device. The portion of metadata includes the metadata received from the device that interfaces with the main device and metadata associated with the secondary device. The metadata related to the secondary device includes data related to each of the plurality of users, such as demographic data defining the user attributes, and the metadata from the device interfacing with the main device captures switch stream associated with each of the plurality of users. The metadata is used to generate historical data associated with the plurality of users. The historical data is analyzed to identify the surfing paths of each of the plurality of users and companion content is generated for a particular user based on the surfing paths of a subset of the plurality of users whose user attributes match the user attributes of the particular user. The companion content is forwarded to the local application for rendering on the secondary device while the secondary device is connected to the device that interfaces with the main device rendering the content.

A system for generating companion content for rendering on a secondary device during presentation of content on a main device is disclosed. The system includes a main device, a secondary device executing a local application and a server device executing a server application. The main device is connected to a network through a device, such as a set-top box. The set-top box (STB) includes an application programming interface (API) to interact over the network. The API of the STB is configured to interact with the secondary device to share data associated with the content, such as switch stream that identifies show parameters for the multimedia shows, being rendered on the main device based on user selection. The local application through an API in the secondary device is configured to interact with the API of the STB to obtain the switch stream that identifies metadata regarding content, such as multimedia show, being rendered at the main device. The API of the secondary device provides access to control selection of what is to be rendered on the main device. The local application is interfaced over the internet with the server application. The server application detects execution of the local application on the secondary device and communicates with the local application over the internet to receive at least a portion of metadata from the secondary device, wherein the portion of metadata includes metadata received from the device that interfaces with the main device and metadata associated with the secondary device. The metadata associated with the secondary device includes data, such as user attributes in the form of demographic data, related to a particular user and the metadata from the device that interfaces with the main device captures data related to user switch stream. The server application generates historical data associated with a particular user or a plurality of users using the metadata received from the secondary device, analyzes the metadata within the historical data to identify surfing paths of the particular user or each of the plurality of users and generates companion content for the particular user based on the user attributes and surfing paths of the particular user or the plurality of users. The generated companion content is forwarded to the local application for rendering on the secondary device while the secondary device is connected to the device that interfaces with the main device rendering the content.

Thus, the embodiments of the invention provide an effective and efficient tool that uses the real-estate space on the main device and the secondary device optimally while providing the relevant companion content to the user without compromising the quality or content of the multimedia show rendered at the main device. The rendered companion content is tailored to the particular user based on the surfing path of the particular user or based on the surfing paths of a subset of the plurality of users whose user attributes match the user attributes of the particular user. Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings.

DETAILED DESCRIPTION

Broadly speaking, the embodiments of the present invention provide methods and systems for providing companion content at a secondary device that is tailored for a particular user based on surfing patterns followed by the particular user or a plurality of users on a main device. The companion content lists multimedia shows that are favorites of the particular user or are popular amongst a subset of the plurality of users whose one or more user attributes match the user attributes of the particular user. The companion content presented on the secondary device associated with the particular user is interactive and the user is able to access or select to change a multimedia show rendered on the main device.

The main device is configured to interact with media programming providers over a network, such as the internet, to access and select content for rendering on the main device. The secondary device executes a local application that is configured to interact with a device associated with the main device to obtain switch stream data associated with content being rendered or selected for rendering on the main device. Metadata from the switch stream gathered over time identifies surfing paths followed by a plurality of users over the course of time. A server application executing on a server detects the local application executing on the secondary device; interrogates and obtains the metadata from the switch stream for the content rendering or selected for rendering on the main device associated with a particular user or a plurality of users; constructs historical data that identifies point-to-point transitions (i.e. channel-to-channel traversals) for the particular user/plurality of users defining their surfing paths; analyzes the point-to-point transitions to determine a predictive pattern of viewing followed by the particular user/plurality of users; and generates companion content for rendering on the secondary device of the particular user based on the analysis.

The companion content generated for rendering on the secondary device is tailored to the particular user and identifies multimedia show that closely follows the particular user's viewing pattern or is deemed relevant to the user of the secondary device based on the user's attributes. This tailored content enables a user to efficiently view and navigate through a relevant sub-set of multimedia show options that really matter to the user thereby avoiding having to wade through hundreds of multimedia show options available to the user. Directing the rendering of the companion content to the secondary device provides for optimal use of the real-estate space on the secondary device while reserving the limited real-estate space on the main device for watching the multimedia show thereby enriching the user's TV viewing experience without compromising on the quality. In addition to the companion content, one or more promotional content that are geared specifically to the user or content may also be directed and rendered on the secondary device based on the user attributes of the particular user or companion content information resulting in further de-cluttering the main device while providing un-hindered multimedia show viewing.

Figure 1:
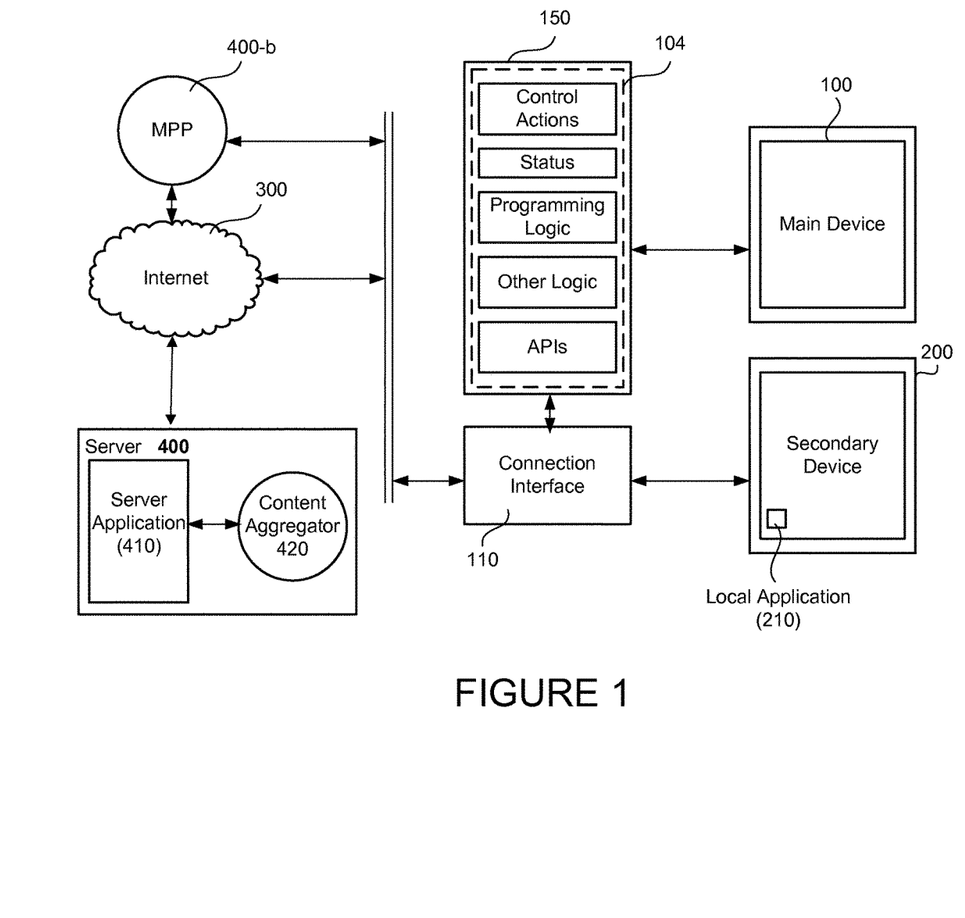
FIG. 1 illustrates a simplified block diagram of a system equipped with an algorithm for delivering companion content to a secondary device, in one embodiment of the invention.

With this brief overview of the benefits and advantages of the invention, various embodiments of the invention will now be described in detail with reference to the figures. FIG. 1 illustrates a simplified block diagram of a system used to deliver companion content to a secondary device during presentation of multimedia content on a main device, in one embodiment of the invention. The system includes a main device 100. The main device may be a television (TV) with associated screen/monitor or a display device to render the multimedia show at the request of a user. The main device is communicatively connected to a network 300, such as an Internet, through a connection interface 110 to request and receive multimedia show distributed by one or more media programming providers (MPP) 400-b.

The connection interface 110 provides a communication interface between the main device 100 and the internet 300 and between the main device 100 and a satellite (not shown) to enable the main device 100 to receive one or more multimedia shows distributed by the MPP 400-b directly through the internet 300 or through the satellite. The connection interface 110 includes one or more set-top boxes (STB) and one or more routers that establish communication connection between the main device 100 and the MPP 400-b over the Internet 300. The STB is equipped with programming logic, such as application programming interface (API), and circuitry to receive request from the main device 100 or a control device associated with the main device for a multimedia show, forward the request to the MPP 400-b, receive the multimedia show from the MPP 400-b directly through the internet 300 or through a satellite, transmit the multimedia show to the main device 100 for rendering, detect control actions and status of the multimedia show at the main device and interact with the MPP 400-b accordingly. In one embodiment, the STB is configured to share show parameters of the multimedia show that is being rendered on the main device with other devices. The show parameters are provided as switch streams and include the metadata of the multimedia show that is being rendered or selected for rendering on the main device.

The system also includes a secondary device 200, such as a connected device, that is communicatively connected to the main device 100 through the API at the STB and to the same network (internet 300) as the main device. The secondary device could be a laptop computer, a desktop or personal computer (PC), a tablet computing device, such as a iPad (registered TM), a mobile computing device, such as a personal digital assistant (PDA), mobile phone, or the like that is communicatively configured to interact with the main device. The secondary device is not limited to the aforementioned list of computing devices but may include other types of mobile/desktop devices that are capable of being communicatively connected to the main device and the internet 300. The secondary device 200 includes a display/rendering device for rendering information obtained from the internet.

The secondary device 200 executes a local application 210 that is configured to interact with the device connected to the main device through an API. The local application 210 of the secondary device 200 obtains the switch streams from the device that is connected to the main device through the API and identifies the metadata related to the content rendered/selected for rendering on the main device. The metadata is used to identify surfing patterns/paths followed by the particular user over time and is used to generate companion content for the particular user. The companion content, as used in this application, is a listing of multimedia content along with brief description of each of the multimedia content. The local application may process at least a portion of the metadata received from the device that interfaces with the main device 100. Thus, in one embodiment, in addition to the content information, the metadata provided by the secondary device may also include user attributes of a particular user and any device specific information associated with the secondary device 200 based on the processing of the metadata by the local application at the secondary device 200.

The secondary device 200 is connected to a server 400 executing a server application 410 over the internet 300. The server application 410 detects the local application 210 executing on the secondary device 200 upon the triggering of the local application 210 triggered for execution at the secondary device 200. The server application 410 then queries the local application 210 and retrieves at least a portion of the processed metadata that includes switch stream metadata obtained by the local application 210 from the device connected to the main device 100 and user/device attributes associated with the secondary device. In one embodiment, the metadata obtained from the secondary device 200 is used to generate historical data for the particular user. The historical data of the particular user is analyzed to identify surfing paths followed by the particular user over time to define predictive pattern of viewing. In one embodiment, the switch stream metadata is used to identify point-to-point traversals followed by the particular user and select the multimedia content accordingly. The server application 410 generates companion content based on the surfing paths of the particular user and forwards the companion content to the local application 210 for rendering on the secondary device 200 while the secondary device 200 is connected to the device that interfaces with the main device 100. In one embodiment, for generating companion content for a particular user, the server application first identifies a time period for which the companion content is being generated. The server application then determines content available for rendering on the main device for the identified time period using the metadata from the switch stream. The metadata from the switch stream includes information related to point-to-point traversals, resident time at each point and time of day, among other data. Since the multimedia content available for rendering on the main device varies depending on days and times of days, it is essential that the server application identify what content is available for rendering for the specific period of time and what content was viewed during the related time period before generating a recommended companion content list that is relevant for the day, time and user for which the companion content is sought.

The system may also include a repository, such as a content aggregator 420, to store the historical data generated for the particular user using the metadata from the user's switch streams received from the secondary device 200. The user's switch streams define the user's interaction at the main device 100 over time. In one embodiment, the historical data of the particular user is mined for a specific period of time and companion content is generated for the particular user based on the analysis of the mined data. For instance, the historical data associated with the particular user may be mined for data from a particular time in a particular day of a week over a period of one month and the mined data may be analyzed to generate the companion content for the particular user. The details of generating companion content for a particular user will be explained in greater detail with reference to FIG. 3.

In another embodiment, the server application 410 on the server device 400 may be used to query and obtain metadata from a plurality of secondary devices 200 associated with a plurality of users over a period of time. The metadata associated with the plurality of users is gathered and used to generate historical data of the plurality of users. The metadata from the secondary device 200 may include user surfing data obtained as switch streams from the device (i.e. STB) that is connected to the main device 100 and user attributes provided by the secondary devices 200. The generated historical data for the plurality of users is maintained in a database, such as a content aggregator database 420. The server application 410, in this embodiment, further queries and obtains user attributes of a particular user associated with a particular secondary device 200. The server application 410 then mines the historical data of the plurality of users to identify data associated with a sub-set of the plurality of users whose user attributes match at least a portion of the user attributes of the particular user. The user attributes may include user demographic data and any other data that describe the user, such as age group, geo location, gender, race, etc., of the user.

In one embodiment, user switch streams recording switch-through activity of a plurality of users at the corresponding main devices 100 are obtained when the users selected a particular multimedia show or switched from one multimedia show to another for viewing at the respective main devices 100. The switch click streams are obtained by the server application 410 from the local application 210 executing in the plurality of secondary devices 200 associated with the plurality of users, along with related metadata exposed by the device connected to the main devices 100 and relevant user attributes of each of the plurality of users. The server application 410 generates the historical data encompassing the data in the user switch streams, which includes switch stream metadata and user attributes and stores the generated historical data in content aggregator 420 for subsequent mining.

The server application 410 mines the historical data of the plurality of users to obtain the surfing paths of the plurality of users. The server application 410 may then construct point-to-point transitions of the plurality of users using the information from the surfing paths; analyze the point-to-point transitions using analysis metrics to determine one or more predictive patterns of viewing of the plurality of users; and generate companion content identifying a list of multimedia shows that are popular with the plurality of users based on the analysis. The analysis metrics, in one embodiment, may identify one or more attributes that may be used in filtering/matching mined data during analysis. For instance, the analysis metrics may identify a time period for analyzing the mined historical data (such as a particular time slot for a particular day in a week), level or percentage of similarity matches required for user attributes and/or viewing history data, in order to declare any two users surfing path data as being similar. Other analysis metrics may be employed as deemed appropriate.

Still referring to FIG. 1, the identified list of multimedia shows within the companion content may be formatted using a template and returned to the secondary device 200 for rendering on a display device associated with the secondary device 200 so as to provide a particular user with a preferred sub-set of multimedia shows available for viewing based on what is popular with users that have similar demographic data/user attributes as the particular user. The multimedia shows in the companion content is interactive in that a multimedia show within the list may be selected for rendering on the main device 100 or for changing whatever is being rendered on the main device 100. The identifying of the surfing paths, constructing of historical data, analyzing the historical data and generating companion content are all performed automatically by the server application 410 based on a user action at the secondary device. The user action at the secondary device may be a login action where a user enters one or more user metrics (i.e. user attributes) identifying the user and or the secondary device. The formatted and rendered companion content is a tailored list of the multimedia show that is relevant to the user.

Figure 1A:
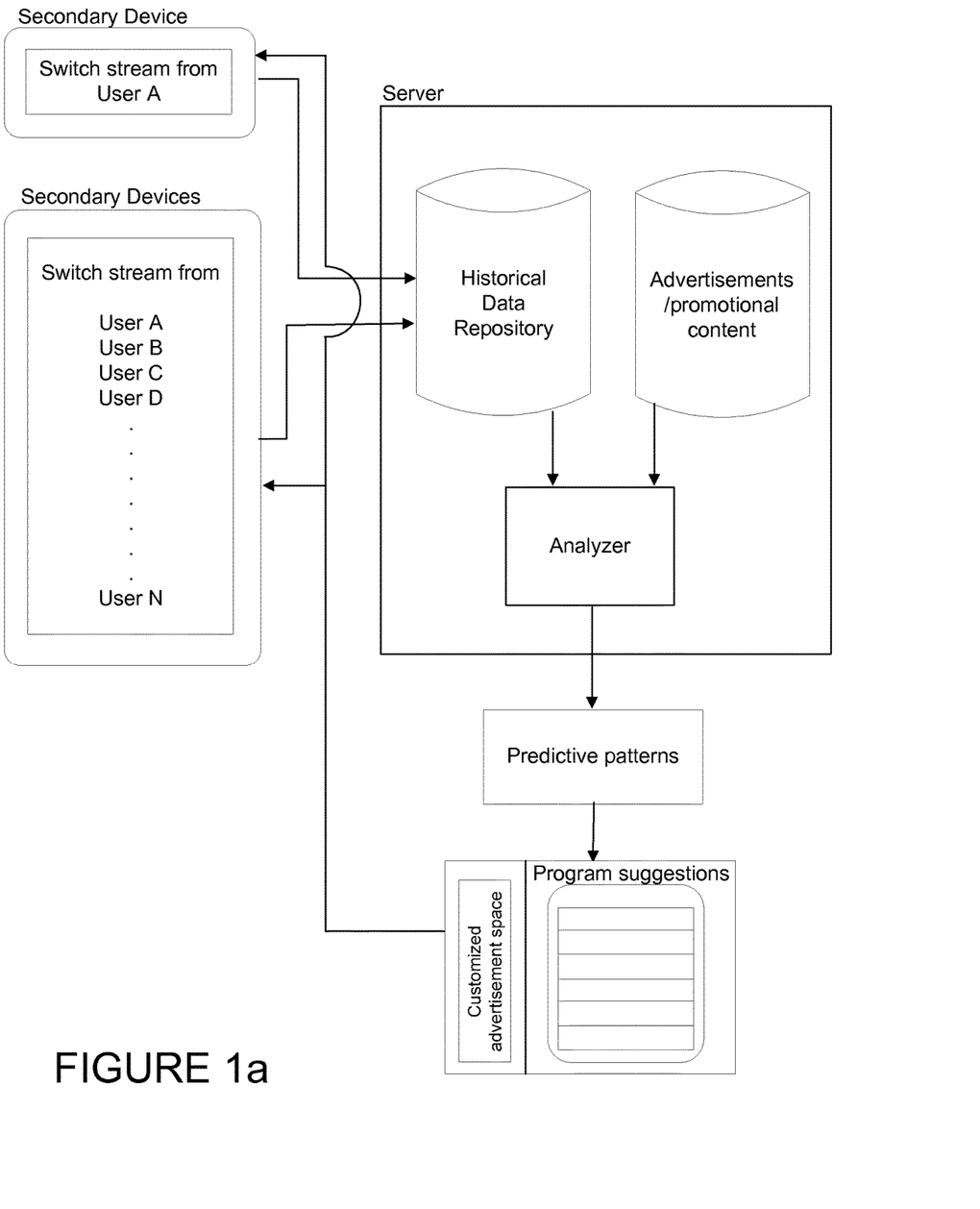
FIG. 1a illustrates data flow through the system during the generation of the companion content, in one embodiment of the invention.

FIG. 1a illustrates the data flow through the system during the generation of the companion content, in one embodiment of the invention. As illustrated, switch stream from a particular user, user A, or a plurality of users, user A , user B, . . . User N, are accessed and retrieved by a local application executing on a secondary device through an API of a device that interacts with the main device where the content is rendered. The switch stream data is transmitted by the secondary device to a server application executing on a server. The server application stores the switch stream data in a history repository for subsequent mining and analysis. An analyzer within the server application mines the data in the history repository of a particular user or a plurality of users and analyzes the data to identify predictive patterns of viewing by the particular user or the plurality of users. The analyzer constructs point-to-point traversals/transitions associated with the particular user or the plurality of users using the mined data and determines the transition pattern followed by the particular user/plurality of users. Based on the analysis, a set of companion content is identified and transmitted to the secondary device of the particular user for rendering. Along with the companion content, one or more promotional content in the form of advertisements, etc., are also returned for rendering at the secondary device.

Figure 2:
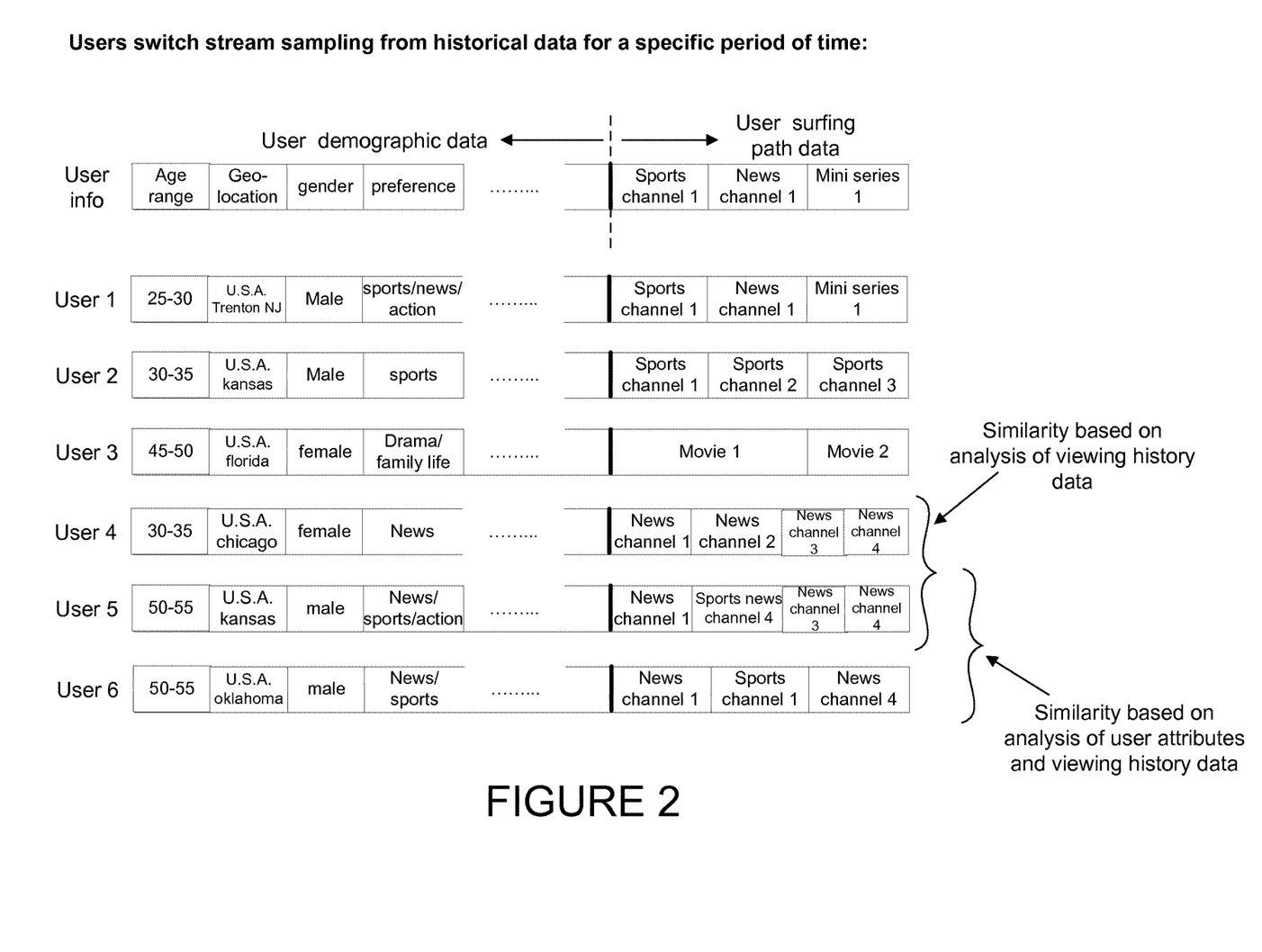
FIG. 2 illustrates a sample switch stream data of a sub-set of users stored in historical data and extracted during mining for generating companion content, in one embodiment of the invention.

FIG. 2 illustrates a sample switch stream data of a sub-set of users stored in historical data and extracted during mining for generating companion content, in one embodiment of the invention. As depicted, each user switch stream includes user surfing path data and user attributes that identifies the user's demographic data. For instance, the user demographic data may include age or age group, gender, geo location, race/ethnicity, and other user attributes that may be relevant to identify a particular user. The user switch streams identifies the particular user's surfing path data including the point-to-point traversals that the user made during a particular period of time. For instance, as illustrated in FIG. 2, user 1 traversed from sports channel 1 to news and then to a miniseries during a particular time period on Monday night. During the same time period and same night, user 2 traversed from sports channel 1 to sports channel 2 and then to sports channel 3; user 3 traversed from movie channel 1 to movie channel 2, user 4 traversed from news channel 1 to news channel 2 to news channel 3 and then to news channel 4; user 5 traversed from news channel 1 to news channel 2 and then to news channel 4; and so on. The server application 410, in one embodiment, may analyze the viewing history data from a plurality of users for the specific time period using analysis metrics and the information from the user switch streams, determine the surfing paths of each of the plurality of users for the particular period of time, and determine which set of users surfing path and user attributes match. For e.g., from the example illustrated in FIG. 2, it can be seen that users 4 and 5 have a surfing path similarity. Based on the analysis, the server application 410, in one embodiment, generates companion content for rendering on the secondary device of a particular user, in response to activation of the local application at the corresponding secondary device. The companion content generated includes information related to multimedia content identified in the surfing paths of the majority of the plurality of users at the given time.

In another embodiment, in addition to the surfing path data, the server application may identify and use user attributes of the plurality of users available within the user switch stream for generating companion content for a particular user. The server application may use a pre-defined threshold level during the analysis to determine which user's data can be considered for generating the companion content. For instance, from the sample user switch stream depicted in FIG. 2, the server application may determine that the surfing paths of users 4 and 5 are similar. However, the user attributes associated with User 4 is not similar to the user attributes associated with User 5. Accordingly, the server application determines that the surfing paths of User 4 and User 5 as being dissimilar, based on the mismatch in the user attributes of users 4 and 5. Upon further analysis, the server application may find that Users 5 and 6 have user attributes that match with each other.

Based on the match in the user attributes, the server application analyzes the surfing paths of the users 5 and 6 and determines a certain level of match, which might not be as high as that found with the surfing paths of users 4 and 5 but are at least at the predefined threshold level. Consequently, the server application may use the surfing paths identified by the switch stream from Users 5 and 6 to generate companion content for the particular user in response to activation of the local application on the corresponding secondary device.

In one embodiment, the server application may analyze and generate the companion content using the time of day or time period, in addition to user attributes and surfing paths of a plurality of users, for mining data from the historical data. As different multimedia content, such as TV shows, is available on different days and times, it is only appropriate to use the time of day/time period during analysis for mining user switch streams within the historical data of the plurality of users in order to generate companion content for a particular user. The mining of data for a time period/time of day would result in identifying companion content that is most appropriate for the particular user for the accessed time period.

In one embodiment, the server application may query and receive user attributes of a particular user from a secondary device associated with the particular user. In another embodiment, the user attributes of a particular user are provided by the secondary device in response to user action at the secondary device. The user attributes sufficiently identify the user and may provide insight into the particular user's viewing interest. Upon receiving the user attributes of the particular user, the server application then mines the historical data to identify user switch streams associated with a sub-set of the plurality of users whose user attributes match the user attributes of the particular user. The surfing paths from the identified user switch streams are used to generate point-to-point transitions that are analyzed using analysis metrics to determine path analysis similarity amongst the identified sub-set of users at least to a predetermined threshold level. Based on the analysis, the companion content for the particular user are generated and returned to the secondary device for rendering, in response to activating the local application on the secondary device. The above example illustrated in FIG. 2 uses a very small sampling of user switch streams in order to generate companion content for illustration purpose. Accordingly, it should be noted that the actual sampling of users may involve hundreds or even thousands of users switch streams for analyzing and generating companion content.

Figure 2A:
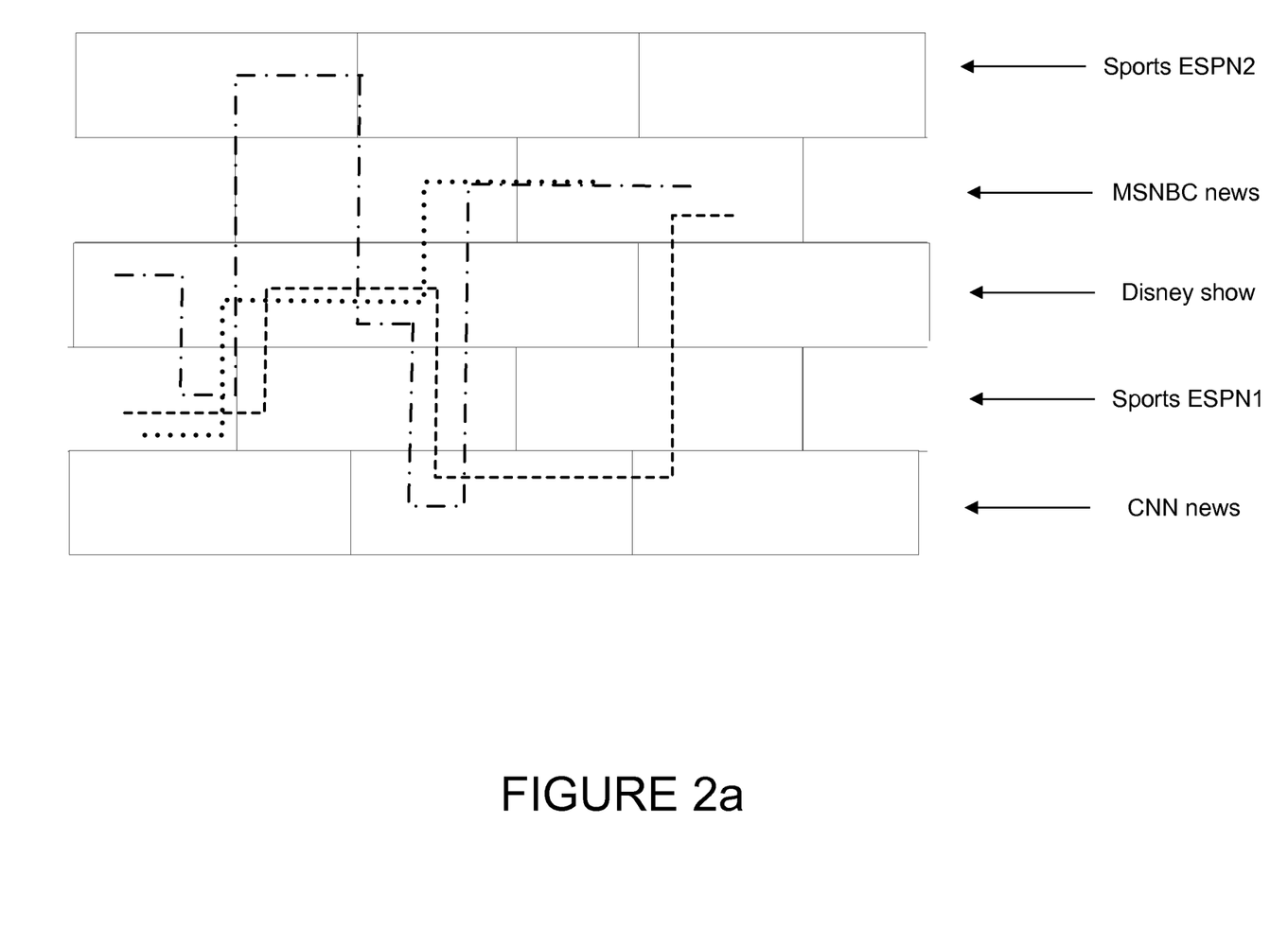
FIG. 2a illustrates a point-to-point transition followed by a plurality of users that are captured in the switch streams used during generation of companion content, in one embodiment of the invention.

FIG. 2a illustrates a point-to-point transition followed by a plurality of users that are captured in the switch streams retrieved by the local application executing on the secondary device from the device that interfaces with the main device. The switch streams identify the metadata related to the content that is currently rendering or is selected for rendering on the main device. As can be seen, user A starts viewing a Disney show content for some time before transitioning to sports channel, ESPN1®, and watches the show for a brief period before transitioning to a second sports channel, ESPN2®, where he stays for an extended period before transitioning to the Disney show again. From the Disney show, user A transitions to CNN® news and then onto MSNBC news channel. Accordingly, based on the point-to-point traversals of user A, it can be seen that user A is interested in sports and news with a small interest in the Disney channel. Accordingly, if the server application has to provide companion content for this user, it will provide companion content related primarily to sports and news with a mix of Disney or like channels included.

Continuing with FIG. 2a, user B starts at sports channel, ESPN 1®, transitions after a period of time to Disney channel and then onto CNN news where he spends a considerable amount of time before transitioning to MSNBC. The analyzer of the server application would look at the point-to-point transitions of Users A and B, the resident time at each transition point and time of day associated with users A and B and determine that the two users surfing paths are similar. The analyzer may also determine that the two users' attributes are also similar. Based on this analysis the analyzer may generate companion content for a third user, which includes the shows that are similar to the ones that users A and B are viewing, in response to a user action at a corresponding secondary device by the third user. During the generation of the companion content for the third user, the analyzer, in one embodiment, may also try to match the user attributes of the third user with that of the first and second users to ensure that the companion content is suitable and relevant for the third user.

Figure 3:
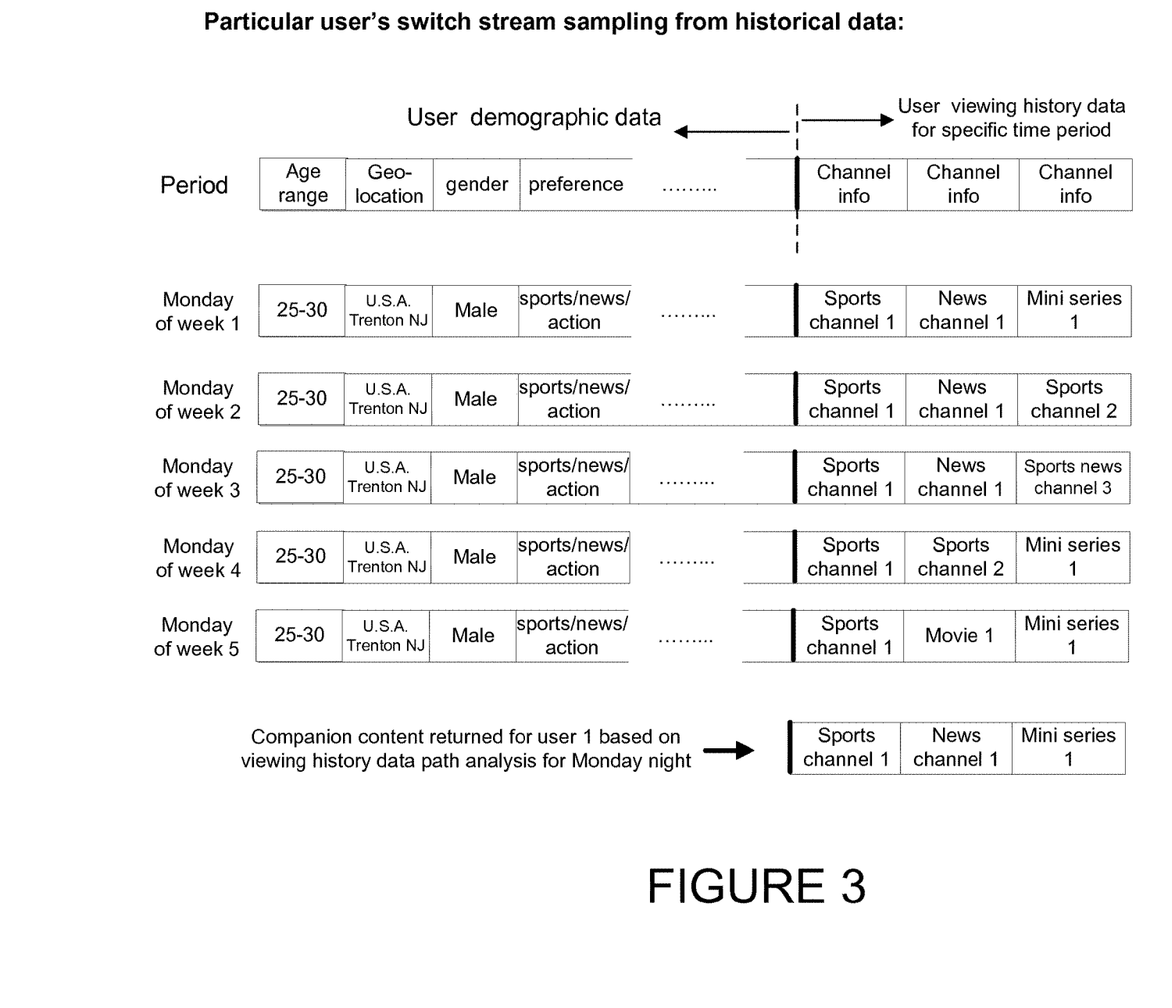
FIG. 3 illustrates a sample switch stream data of a particular user stored in historical data and extracted during generation of companion content, in one embodiment of the invention.

FIG. 3 illustrates a sampling of user switch stream associated with a particular user collected over time and stored in historical data, in one embodiment of the invention. As mentioned above, the sampling is kept very small in order to provide an understanding of the invention. In actual scenarios, the sampling may include a much bigger sample of the user's switch streams to generate more appropriate companion content. The server application 410 receives the user switch stream from the secondary device along with user attributes. The user switch streams of the particular user are used to generate and/or populate historical data for the particular user. The historical data of the particular user are mined for a specific time period to identify the particular user's surfing path(s). In one embodiment, the historical data is mined for a specific time period for a specific day of the week over a certain time length and the mined data is analyzed to determine the surfing path followed by the particular user. For instance, in the example illustrated in FIG. 3, the historical data is mined for data associated with the particular user for a Monday night for a month. Using the mined data for each of the Mondays spanning the month, the server application determines the surfing path followed by the particular user and constructs the companion content for the specific time period on Monday night based on the analysis of the viewing stream transitions. After rendering the companion content, the server application continues to analyze the surfing path followed by the particular user and adjusts the companion content rendered at the secondary device based on the analysis so as to consider change in taste of the user over time.

The server application provides an effective tool that generates companion content for the multimedia show directed to a particular user that can be rendered on the secondary device associated with the user. The companion content could include a multimedia show that is currently selected for rendering on the main device or may be selected for subsequent rendering. The local application at the secondary device is configured to enable user interaction at the companion content so that any action directed at the companion content on the secondary device can affect the multimedia show at the main device, affect the data provided to the historical data that eventually affects the companion content generated for rendering at the secondary device or provide social interaction.

In addition to the companion content information, the server application may identify and return one or more promotional content for rendering alongside the companion content. The promotional content may be specific to a multimedia show being returned in the companion content, specific to the user(s) that is viewing the companion content or specific to the secondary device. The promotional content may be provided by the MPP providing the content for the multimedia show listed in the companion content, provided by the server application or may be provided by any other source. It should be noted that the server application interacts with a plurality of multimedia content providers, a plurality of promotional content providers, a plurality of secondary device providers. As a result, the server application may provide the promotional content from any of these sources or from any other source. The above list of sources is exemplary and should not be considered restrictive. The server application identifies a plurality of promotional content based on a certain selection criteria, ranks and prioritizes the promotional content and selects one or more promotional content for inclusion in the companion content returned to the secondary device. The selection criteria for selecting the promotional content may be specific to the secondary device, may be specific to the multimedia show being returned in the companion content, specific to the user(s) of the secondary device to which the companion content is targeted or based on the promotional content provider.

As can be seen, the various embodiments provide an efficient tool that makes optimal use of limited real-estate space on the display devices associated with the main device and the secondary device. The companion content is provided with sufficient details for the list of multimedia show so as to allow a user to make informed selection without compromising on the quality of viewing.

Figure 4:
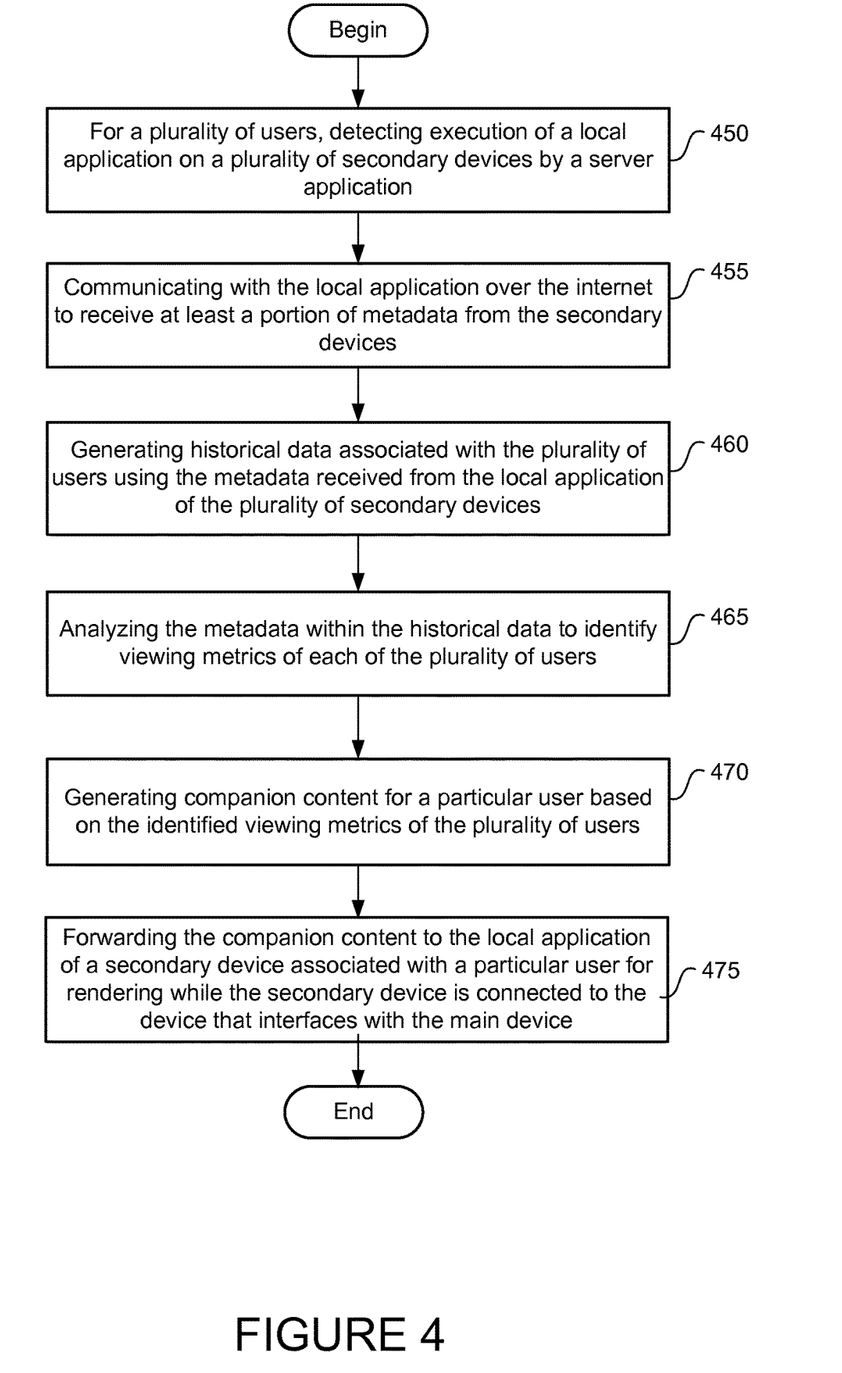
FIG. 4 illustrates a flow chart of process operations used in generating companion content for a particular user using viewing metrics of a plurality of users, in one embodiment of the invention.

FIG. 4 illustrates a flow chart of process operations used in providing companion content at a secondary device, in one embodiment of the invention. The process begins with operation 450 wherein for a plurality of users, execution of a local application on a plurality of secondary devices is detected by a server application, as illustrated in operation 450. The local application at each of the plurality of secondary devices communicates with a respective device that is communicatively connected to a corresponding main device rendering content selected by each of the plurality of users, through an API. The main device is connected to a network, such as the internet, through the device, such as a set top box, using a router and the secondary device is connected to the same network as the main device using the router. The secondary device obtains switch streams that identifies metadata associated with the content being rendered or is selected for rendering at each of the main devices. The server application communicates with the local application over the internet to receive at least a portion of the metadata obtained through the switch streams from the main devices, as illustrated in operation 455. Historical data is generated and/or populated with the metadata obtained from the secondary devices, as illustrated in operation 460. The metadata within the historical data is analyzed using analysis metrics to identify surfing paths of the plurality of users, as illustrated in operation 465. The surfing paths may be identified by first identifying point-to-point transitions of each of the plurality of users using the metadata and analyzing the transitions using analysis metrics. The surfing paths are used in identifying similarity in transitions between two or more users of the plurality of users. Companion content for a particular user is generated based on transition path similarity identified between two or more users, as illustrated in operation 470. In one embodiment, the similarity in transitions amongst a majority of the plurality of users is used in generating the companion content. In another embodiment, the similarity in transitions amongst a sub-set of the plurality of users along with similarity in user attributes of the sub-set of the plurality of users is used in generating the companion content. In yet another embodiment, the server application tries to find a match of the user attributes of the particular user with the user attributes of a sub-set of the plurality of users. When a match of the user attributes is found, then the server application uses the similarity in transitions amongst the sub-set of the plurality of users to generate the companion content for the particular user. The generated companion content is forwarded to the local application of the secondary device for rendering while the secondary device is still connected to the device that interfaces with the main device, as illustrated in operation 475.

Upon forwarding the companion content to the secondary device, the server application continues to dynamically monitor user interactions at the secondary device. The user interactions influence selection of content for rendering or further refining of the content that is being rendered at the main device. The server application obtains the user interactions in the form of user switch streams from the secondary device and updates the historical data for subsequent mining. The server application constantly mines the updated historical data and dynamically refines the companion content. The refined companion content is returned to the secondary device for rendering while the secondary device is connected to the device interfacing with the main device. The process of monitoring user interactions and refining the companion content continues so long as the secondary device is executing the local application and is connected to the device interfacing with the main device.

Figure 5:
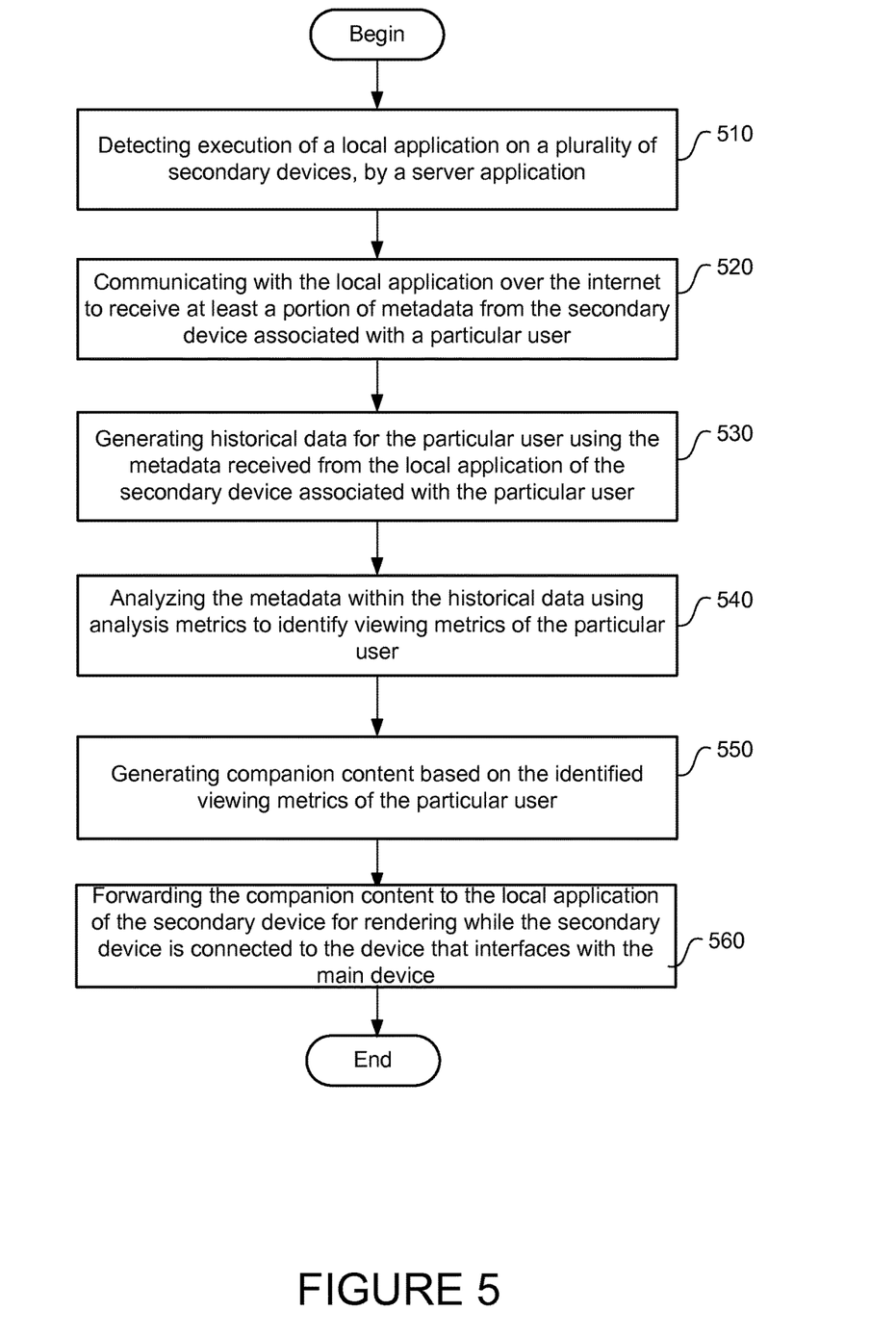
FIG. 5 illustrates a flow chart of process operations used in generating companion content for a particular user using the viewing metrics of the particular user, in an alternate embodiment of the invention.

In an alternate embodiment illustrated in FIG. 5, the process begins with detection of execution of a local application on a secondary device, by a server application, as illustrated in operation 510. The local application at the secondary device communicates with a device that is communicatively connected to a main device to obtain data related to content selected for rendering at the main device by the particular user, through an API. The main device is connected to a plurality of media programming providers through the internet using the device, such as a set top box, and a router. The secondary device is connected to the same network as the main device using the router. The secondary device obtains metadata associated with the content being rendered or is selected for rendering at the main device. The server application communicates with the local application over the internet to receive at least a portion of the metadata obtained from the main device, as illustrated in operation 520. Historical data is generated and/or populated with the metadata obtained from the secondary device, as illustrated in operation 530. The metadata within the historical data is analyzed using analysis metrics to identify surfing path followed by the particular user over time, as illustrated in operation 540. Companion content for the particular user is generated based on the surfing path of the particular user, as illustrated in operation 550. The process concludes with the generated companion content being forwarded to the local application of the secondary device for rendering while the secondary device is connected to the device that interfaces with the main device, as illustrated in operation 560, wherein the secondary device is associated with the particular user. In one embodiment, the companion content being returned to the secondary device may include one or more promotional content that is related to the content being returned, related to the user or related to the secondary device. The promotional content is rendered alongside the companion content at the secondary device.

In one embodiment, upon forwarding the companion content to the secondary device, the server application may continue to dynamically monitor user interactions at the companion content rendered at the secondary device. The user interactions may be directed to influence selection of content for rendering or change content that is being rendered at the main device. The server application obtains the user interactions as user switch-streams and updates the historical data. The server application uses the updated historical data to dynamically refine the companion content. The refined companion content is returned to the secondary device for dynamic rendering while the secondary device is connected to the device interfacing with the main device. The process of monitoring, obtaining user interactions, refining and forwarding of the companion content continues so long as the secondary device is executing the local application and is connected to the device interfacing with the main device.

It will be obvious, however, to one skilled in the art, that the present invention may be practiced without some or all of these specific details. In other instances, well known process operations have not been described in detail in order not to unnecessarily obscure the present invention.

Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention could employ various computer-implemented operations involving data stored in computer systems. These operations can include the physical transformations of data, saving of data, and display of data. These operations are those requiring physical manipulation of physical quantities. Usually, though not necessarily, these quantities take the form of electrical or magnetic signals capable of being stored, transferred, combined, compared and otherwise manipulated. Data can also be stored in the network during capture and transmission over a network. The storage can be, for example, at network nodes and memory associated with a server, and other computing devices, including portable devices.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. The computer readable medium can also be distributed over a network-coupled computer system so that the computer readable code is stored and executed in a distributed fashion.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for generating companion content for rendering on a secondary device during presentation of content on a main device, comprising:
   for each of a plurality of users,
     detecting, by a server application, execution of a local application on the secondary device, the local application using a wireless connection to communicate between the secondary device and a device that interfaces with the main device, the local application connecting through an application programming interface (API) to access the device that interfaces with the main device, the API providing access to metadata regarding content being rendered on the main device and access to control selection of what content is to be rendered on the main device;
     communicating, by the server application, with the local application over the internet to receive at least a portion of the metadata from the secondary device, wherein the portion of metadata includes metadata defining switching of streams of content rendered on the main device as received from the device;
   analyzing the metadata to identify content navigation paths of each of the plurality of users over time, wherein analyzing the metadata includes,
     constructing point-to-point transitions associated with the one or more of the plurality of users using the navigation paths and the metadata, wherein the points relate to content streams and resident time at each of the content streams and the transition relates to transitioning from one content stream to another content stream defined by the switching; and
     generating companion content for a particular user based on similarity of content selected by the particular user to content identified from the navigation paths determined from the plurality of users, the generated companion content returned for rendering on the secondary device while the content is being presented on the main device, wherein the companion content includes a listing of different content available for viewing at a time when the content is being presented on the main device, the listing of different content includes information related to content that is currently being presented on the main device and other content that are scheduled for the time, the companion content being customized for the particular user based on the navigation path detected for the particular user.

2. The method of claim 1, further comprising,
forwarding the companion content to the local application for rendering on the secondary device associated with the particular user while the secondary device is connected to the device that interfaces with the main device rendering the content.

3. The method of claim 1, wherein analyzing the metadata further includes,
analyzing the point-to-point transitions associated with the one or more of the plurality of users using analysis metrics to determine a predictive pattern of viewing of the one or more of the plurality of users, the predictive pattern used in generation of companion content for the particular user.

4. The method of claim 1, wherein generating companion content further includes,
determining content available for rendering on the main device for a given period based on the viewing metrics of the plurality of users; and
collecting the companion content from the available content for returning to the secondary device.

5. The method of claim 1 further includes,
detecting changes to the metadata received from the secondary device, wherein the changes to the metadata include changes to the content selected for rendering at the main device by one or more of the plurality of users; and
refining the companion content forwarded to the secondary device of the particular user based on the detected changes to the content selected by the one or more of the plurality of users.

6. The method of claim 1, wherein generating companion content further includes, identifying a promotional media based on any one of the companion content generated, or secondary device of the particular user; and integrating the promotional media into the companion content returned to the secondary device for rendering.

7. A system for generating companion content for a secondary device based on content being rendered on a main device having a display, comprising:

a server application executing on a server, the server application configured to, detect execution of a local application on the secondary device, wherein the local application uses a wireless communication connection to communicate between the secondary device and a device that interfaces with the main device, the local application connects to an application programming interface (API) of the device to access the device, the API of the device provides metadata regarding content being rendered on the main device through switch streams and access to control selection of what content is being rendered on the main device through the wireless communication connection;

receive the metadata from the local application executing on the secondary device over the internet in substantial real-time;

analyze at least part of the metadata to produce companion content based on content navigation paths defined by the metadata, wherein the analysis includes, constructing point-to-point transitions associated with the one or more of a plurality of users using the content navigation paths and the metadata, wherein the points relate to content streams and resident time at each of the content streams and the transition relates to transitioning from one content stream to another content stream defined by the switching;

identify the companion content for a particular user based on similarity of content selected by the particular user to content identified from the content navigation paths of the plurality of users;

return the companion content to the local application on the secondary device for rendering while the content is being presented on the main device, the companion content returned includes a listing of different content available for viewing at a time when the content is being presented on the main device, the listing of different content includes information related to content that is currently being presented on the main device and other content that are schedule for the time, the companion content is customized for the particular user based on the navigation path of the particular user; and detect changes in the content being rendered on the main device based in part on the analysis of the metadata obtained from the local application, the changes in the content is used to refine the companion content being returned to the secondary device for rendering, wherein the companion content returned to the secondary device is refreshed from time to time based on detected changes in the content being rendered on the main device.

8. The system of claim 7 further includes a repository for storing the content navigation paths defined by the metadata for subsequent mining.

9. The system of claim 7, wherein the server application is further configured to interact with a promotional media provider to identify and integrate one or more promotional media into the companion content, the identification of the promotional media based at least in part on any one of multimedia content within the companion content, a particular user associated with the secondary device or the secondary device.

* * * * *